(12) United States Patent
Lee et al.

(10) Patent No.: US 11,449,504 B2
(45) Date of Patent: Sep. 20, 2022

(54) DATABASE PARTITION PRUNING USING DEPENDENCY GRAPH

(71) Applicant: SAP SE, Walldorf (DE)

(72) Inventors: Jung Kook Lee, Seoul (KR); Sang II Song, Seoul (KR)

(73) Assignee: SAP SE, Walldorf (DE)

(*) Notice: Subject to any disclaimer, the term of this patent is extended or adjusted under 35 U.S.C. 154(b) by 116 days.

(21) Appl. No.: 16/383,317

(22) Filed: Apr. 12, 2019

(65) Prior Publication Data

US 2020/0311076 A1    Oct. 1, 2020

Related U.S. Application Data

(63) Continuation-in-part of application No. 16/366,351, filed on Mar. 27, 2019, now abandoned.

(51) Int. Cl.
*G06F 16/2453* (2019.01)
*G06F 16/2455* (2019.01)
*G06F 16/901* (2019.01)

(52) U.S. Cl.
CPC .... *G06F 16/24537* (2019.01); *G06F 16/2456* (2019.01); *G06F 16/24554* (2019.01); *G06F 16/9024* (2019.01)

(58) Field of Classification Search
CPC .......... G06F 16/2456; G06F 16/215; G06F 16/9024; G06F 16/24537; G06F 16/24554
See application file for complete search history.

(56) References Cited

U.S. PATENT DOCUMENTS

| | | | |
|---|---|---|---|
| 10,713,244 B2* | 7/2020 | Schwing | G06F 16/2453 |
| 2002/0057269 A1* | 5/2002 | Barber | G06F 3/0481 |
| | | | 345/418 |
| 2012/0290559 A1* | 11/2012 | Fuller | G06F 16/2456 |
| | | | 707/714 |
| 2014/0280159 A1* | 9/2014 | Cao | G06F 16/2456 |
| | | | 707/737 |
| 2016/0371329 A1* | 12/2016 | Bensberg | G06F 16/24542 |
| 2017/0116335 A1* | 4/2017 | Baby | H04L 67/2814 |

* cited by examiner

*Primary Examiner* — Charles D Adams
(74) *Attorney, Agent, or Firm* — Buckley, Maschoff & Talwalkar LLC

(57) ABSTRACT

Provided is a system and method for pruning partitions from a database access operation based on a dependency graph. In one example, the method may include generating a dependency graph for a partition-wise operation, the dependency graph comprising nodes representing partition candidates and links between the nodes identifying dependencies of the partition candidates, receiving, at runtime, a database query comprising a partition identifier, identifying a partition candidate that can be excluded from processing the database query based on the partition identifier, pruning a second partition candidate based on a dependency in the dependency graph between the excluded partition candidate and the second partition candidate, and performing a database access for the database query based on the pruning.

17 Claims, 7 Drawing Sheets

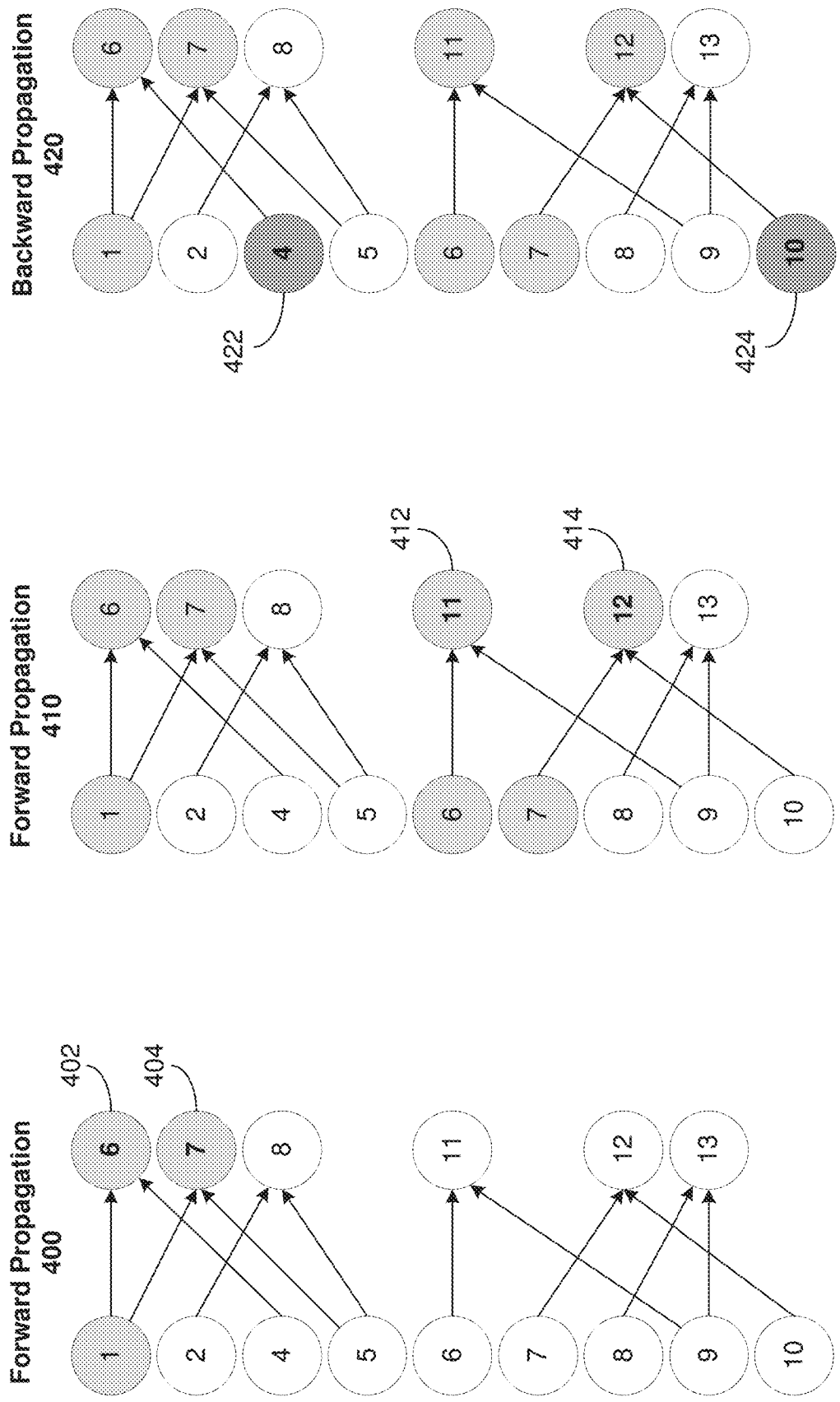

DATABASE PARTITION PRUNING USING DEPENDENCY GRAPH

CROSS-REFERENCE TO RELATED PATENT APPLICATIONS

This application is a continuation-in-part of U.S. patent application Ser. No. 16/366,351, filed on Mar. 27, 2019, in the United States Patent and Trademark Office, the entire disclosure of which is incorporated herein for all purposes.

BACKGROUND

A database query is a mechanism for retrieving data from a database table or a group of database tables. For example, Structured Query Language (SQL) is a declarative querying language that is used to retrieve data from a relational database. In a distributed database system, a program often referred to as a database back-end can run constantly on a server, interpreting data files on the server as a standard relational database. Meanwhile, programs on client computers allow users to manipulate that data, using tables, columns, rows, fields, and the like. To do this, client programs send SQL statements (queries) to the server. The server then processes these statements and returns result sets to the client program.

A database may perform various functions to improve the performance of the system when processing a database query. For example, partition pruning is an essential performance feature for a database. In partition pruning, a query optimizer may analyze content of SQL statements to eliminate unneeded partitions when building a partition access list. This functionality enables a database to perform operations only on those partitions that are relevant to the SQL statement. Based on known tables to be queried through the SQL query, the query optimizer may perform partition pruning during a compiling time. However, there are situations where the tables of a database query are unknown at compile time.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 4A is a diagram illustrating a process of pruning partition candidates in accordance with an example embodiment.

Figure 1:
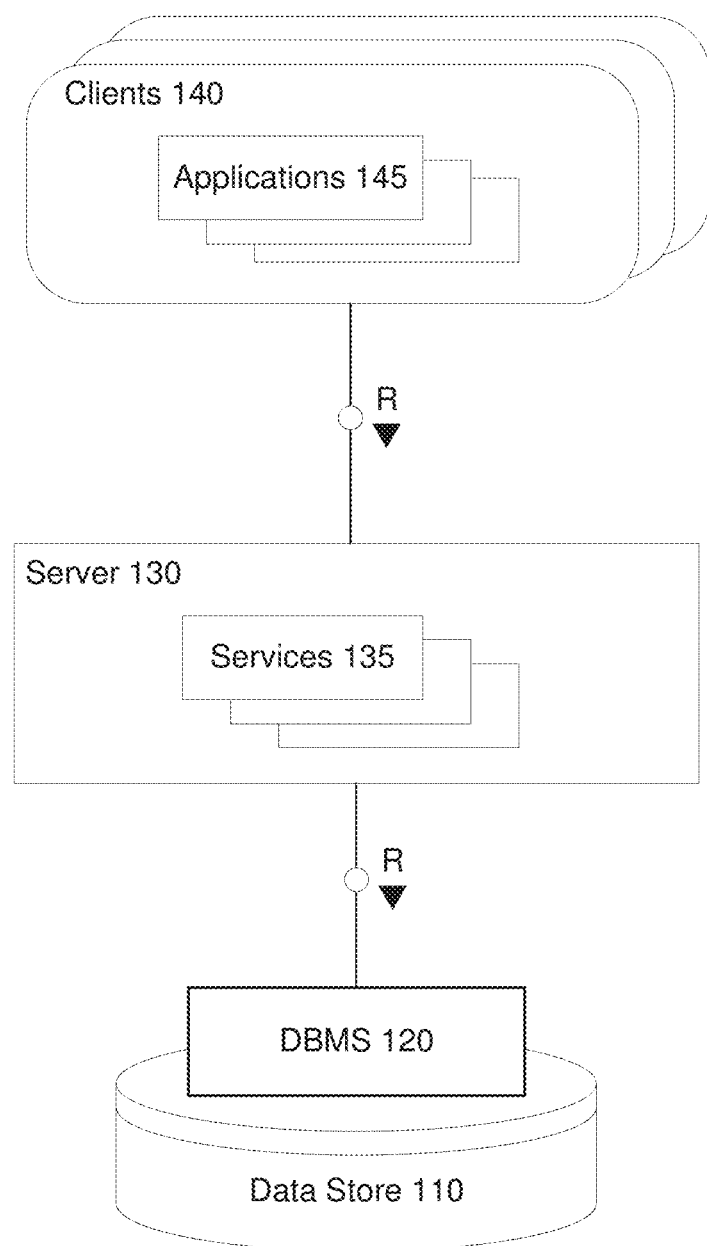
FIG. 1 is a diagram illustrating a database system architecture in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

A query is a request for information from a database such as tabular data stored in one or more tables in a relational database. Because database structures are complex, often the requested data of a query can be collected from the database in different ways, through different data-structures, and/or in different orders. Partitioning is a database process in which very large tables are divided into multiple smaller components. By splitting a large table into smaller, individual tables, queries only need to access a fraction of the data and can run faster because there is less data to scan. Therefore, partitioning can help aid in maintenance of large tables and reduce the overall response time to read and load data for particular SQL operations.

Partition-wise operations included within database queries can significantly reduce response time and improve the use of both a central processing unit (CPU) and memory resources. For example, partition-wise joins can reduce query response time by minimizing the amount of data exchanged among parallel execution servers when joins execute in parallel. In a clustered database environment, partition-wise joins also avoid or at least limit the data traffic over the interconnect, which is key to achieving good scalability for massive join operations. Parallel partition-wise joins are used commonly for processing large joins efficiently and fast. Partition-wise joins can be full or partial, and the database may decide which type of partition-wise join to use.

Partition-wise join operations can be complex and can involve many possible partition pair joins. When the database is aware of a table or tables that are subject to a database query, the database can eliminate or remove partitions from being read that do not include the known tables or tables, and limit a database access to only those partitions where the table exists. This concept is referred to as partition pruning, and can be described as "do not scan partitions where there can be no matching values." By doing so, it is possible to expend much more time and effort in finding matching rows than it is to scan all partitions in the table. When a database makes use of partition pruning in performing a query, execution of the query can be an order of magnitude faster than the same query against a nonpartitioned table containing the same column definitions and data.

One of the drawbacks of conventional pruning techniques is that they are performed during a compile time of the database query. This requires that the database query specify which tables will be accessed to enable the database to know which partitions/tables that can be pruned. However, situations often occur in a database where a table to be accessed by the database query is not identified until runtime (i.e., after compile time). For example, if a parameter condition such as (table=?) is received, the database cannot tell which partitions need to be eliminated because the condition (table=?) indicates that the table value will be bound during an execution phase of the database query. This commonly happens when an application is configured to access different tables with a same operation. In this case, the database has to read all possible partitions from memory (e.g., move stored partitions from disk to RAM, etc.) and determine which table to access after-the-fact.

The example embodiments provide a mechanism by which a database can prune partitions even when the table is not identified until after compile time (e.g. during runtime). For example, the system can build a dependency graph such as a direct acyclic graph (DAG) in which partitions capable of being accessed by a database operation are assigned to a unique identifier and corresponding node in the graph. Here, the partitions (also referred to as partition candidates) may be partitions capable of being read from the database as well as partitions that can be created by joining together pairs of partitions. Links may be generated between the nodes which identify dependencies between the corresponding partitions represented by the nodes. The dependency graph is a static representation of all possible partition candidates of a partition-wise operation and therefore can be created before runtime (e.g., at compile time). In the examples herein, the dependency graph represents join operations performed on database tables (e.g., inner join operations) in a partition-wise command. However, it should be appreciated that different types of operations may also be included in the partition-wise command such as group by, outer join, union all, and the like.

When a database query parameter (also referred to as a runtime parameter) is marked within the database query, the database knows that the table or tables to be accessed will not be received until runtime. When the table identifier(s) is received, the database can use the dependency graph to quickly identify which partitions can be eliminated (pruned) from a read operation. The database may then read only those remaining database partitions (tables) which are capable of being accessed by the runtime parameter of the database query.

FIG. 1 illustrates a system architecture of a database 100 in accordance with an example embodiment. It should be appreciated that the embodiments are not limited to architecture 100 or to a database architecture, however, FIG. 1 is shown for purposes of example. Referring to FIG. 1, the architecture 100 includes a data store 110, a database management system (DBMS) 120, a server 130, services 135, clients 140, and applications 145. Generally, services 135 executing within server 130 receive requests from applications 145 executing on clients 140 and provides results to the applications 145 based on data stored within data store 110. For example, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145 (e.g., drag-and-drop operations), retrieving data from data store 110 based on the requests, processing the data received from data store 110, and providing the processed data to applications 145.

In one non-limiting example, a client 140 may execute an application 145 to perform visual analysis via a user interface displayed on the client 140 to view analytical information such as charts, graphs, tables, and the like, based on the underlying data stored in the data store 110. The application 145 may pass analytic information to one of services 135 based on input received via the client 140. A structured query language (SQL) query may be generated based on the request and forwarded to DBMS 120. DBMS 120 may execute the SQL query to return a result set based on data of data store 110, and the application 145 creates a report/visualization based on the result set. In this example, DBMS 120 may perform a query optimization on the SQL query to determine a most optimal alternative query execution plan. The reconstruction and visualization of the transformations of an optimized query described according to example embodiments may be performed by the DBMS 120, or the like.

An application 145 and/or a service 135 may be used to identify and combine features for training a machine learning model. Raw data from various sources may be stored in the data store 110. In this example, the application 145 and/or the service 135 may extract core features from the raw data and also derive features from the core features. The features may be stored as database tables within the data store 110. For example, a feature may be assigned to its own table with one or more columns of data. In one example, the features may be observed as numerical values. Furthermore, the application 145 and/or the service 135 may merge or otherwise combine features based on a vertical union function. In this example, the application 145 and/or the service 135 may combine features from a plurality of database tables into a single table which is then stored in the data store 110.

The services 135 executing on server 130 may communicate with DBMS 120 using database management interfaces such as, but not limited to, Open Database Connectivity (ODBC) and Java Database Connectivity (JDBC) interfaces. These types of services 135 may use SQL and SQL script to manage and query data stored in data store 110. The DBMS 120 serves requests to query, retrieve, create, modify (update), and/or delete data from database files stored in data store 110, and also performs administrative and management functions. Such functions may include snapshot and backup management, indexing, optimization, garbage collection, and/or any other database functions that are or become known.

Server 130 may be separated from or closely integrated with DBMS 120. A closely-integrated server 130 may enable execution of services 135 completely on the database platform, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the database files stored in the data store 110. The application services can be used to expose the database data model, with its tables, views and database procedures, to clients 140. In addition to exposing the data model, server 130 may host system services such as a search service, and the like.

Data store 110 may be any query-responsive data source or sources that are or become known, including but not limited to a SQL relational database management system. Data store 110 may include or otherwise be associated with a relational database, a multi-dimensional database, an Extensible Markup Language (XML) document, or any other data storage system that stores structured and/or unstructured data. The data of data store 110 may be distributed among several relational databases, dimensional databases, and/or other data sources. Embodiments are not limited to any number or types of data sources.

In some embodiments, the data of data store 110 may include files having one or more of conventional tabular data, row-based data, column-based data, object-based data, and the like. According to various aspects, the files may be database tables storing data sets. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another. Furthermore, data store 110 may support multiple users that are associated with the same client and that share access to common database files stored in the data store 110.

According to various embodiments, data items (e.g., data records, data entries, etc.) may be stored, modified, deleted, and the like, within the data store 110. As an example, data items may be created, written, modified, or deleted based on instructions from any of the applications 145, the services 135, and the like. Each data item may be assigned a globally unique identifier (GUID) by an operating system, or other program of the database 100. The GUID is used to uniquely identify that data item from among all other data items stored within the database 100. GUIDs may be created in multiple ways including, but not limited to, random, time-based, hardware-based, content-based, a combination thereof, and the like.

The architecture 100 may include metadata defining objects which are mapped to logical entities of data store 110. The metadata may be stored in data store 110 and/or a separate repository (not shown). The metadata may include information regarding dimension names (e.g., country, year, product, etc.), dimension hierarchies (e.g., country, state, city, etc.), measure names (e.g., profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 140 may include one or more devices executing program code of an application 145 for presenting user interfaces to allow interaction with application server 130. The user interfaces of applications 145 may comprise user interfaces suited for reporting, data analysis, and/or any other functions based on the data of data store 110. Presentation of a user interface may include any degree or type of rendering, depending on the type of user interface code generated by server 130. For example, a client 140 may execute a Web Browser to request and receive a Web page (e.g., in HTML format) from application server 130 via HTTP, HTTPS, and/or WebSocket, and may render and present the Web page according to known protocols.

One or more of clients 140 may also or alternatively present user interfaces by executing a standalone executable file (e.g., an .exe file) or code (e.g., a JAVA applet) within a virtual machine. Clients 140 may execute applications 145 which perform merge operations of underlying data files stored in data store 110. Furthermore, clients 140 may execute the conflict resolution methods and processes described herein to resolve data conflicts between different versions of a data file stored in the data store 110. A user interface may be used to display underlying data records, and the like.

Figure 2:
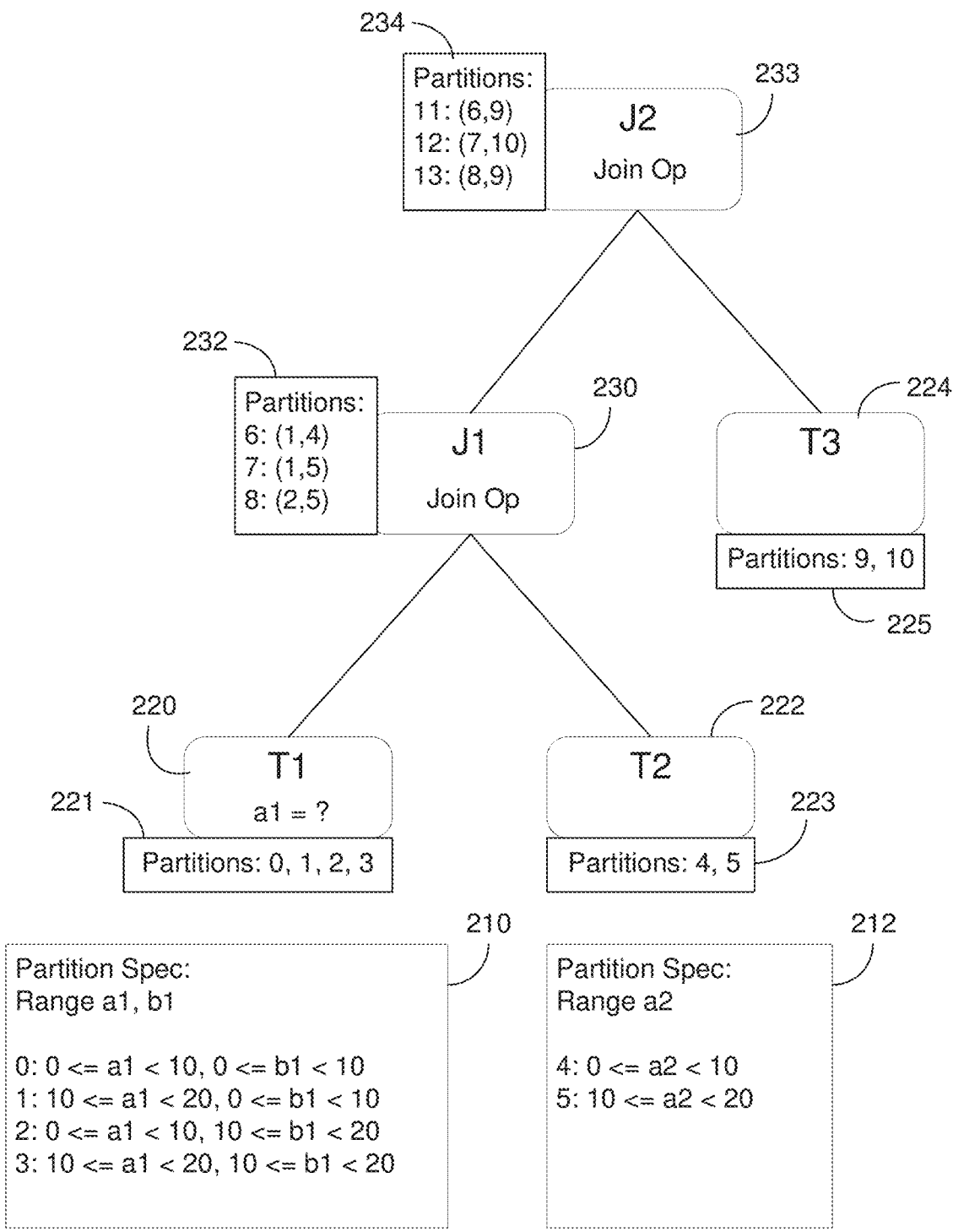
FIG. 2 is a diagram illustrating a query graph identifying partition candidates that are created during a query operation in accordance with an example embodiment.

FIG. 2 illustrates a query graph 200 of a partition-wise join identifying partition candidates that are created during a query operation in accordance with an example embodiment. Referring to FIG. 2, a first table 220 includes a partition specification 210 that divides the first table 220 into four partition candidates 221 which are labeled as partitions 0, 1, 2, and 3. Each partition candidate 221 includes a range of values for two table columns (a1, b1). A second table 222 includes a partition specification 212 that divides the second table 222 into two partition candidates 223 which are labeled as partitions 4 and 5. Each partition candidate 223 includes a range for one table column (a2). In this example, the partition specifications 210 and 212 ma partition the respective first and second tables 220 and 222 by column numbers. For example, for the first table 220, if the column a1 is between 0 and 10, and the column b1 is between 0 and 10, the partition number is 0, and if the column a1 is between 11 and 20 while b1 is between 0 and 10, the partition number is partition 1, etc.

In the example of FIG. 2, a partition-wise join operation may be performed to join columns from the first table 220 with the second table 222. Here, there are four partitions in the first table 220 and two partitions in the second table 222, making it possible for (4×2=8) eight possible candidate partitions. However, a specific join operation 230 reduces the amount of partition candidates. Here, the join operation results in partition candidates 232 that can result from the join operation 230 being performed on the partitions 221 and partitions 223 from the first table 220 and the second table 222. For purposes of example, assume the statement for the join operation 230 includes the following:

(a1=a2) and (a1≠b1) and (b1<=a2).

As a result of join operation 230, there are three possible join pairs of partitions from the first and second tables 220 and 222 rather than the eight maximum total possible. Here, the join pairs are (1,4), (1,5), and (2,5) which are partition candidates 232 of the join operation 230 and are labeled as partitions 6, 7, and 8, respectively. The query graph further includes a third table 224 having a partition spec (not shown) that divides the third table 224 into two partition candidates 225 which are labeled as partitions 9 and 10. Furthermore, query graph 200 includes a second join operation 233 which results in partition candidates 234 which are labeled as partitions 11, 12, and 13, respectively. Here, the partition specification and the join operation are not shown for convenience.

During a query optimization process, if a proper filter condition is given for pruning the query graph 200, for example, a1=15, the query optimizer can prune the partition candidates accordingly. However, in the example of FIG. 2, the table parameter value (a1=?) for the first table 220 is an unknown parameter value and is considered a runtime parameter provided during execution of the query. Therefore, it is not possible to perform a traditional pruning operation because the query optimizer must compile the query prior to executing the query.

Figure 3:
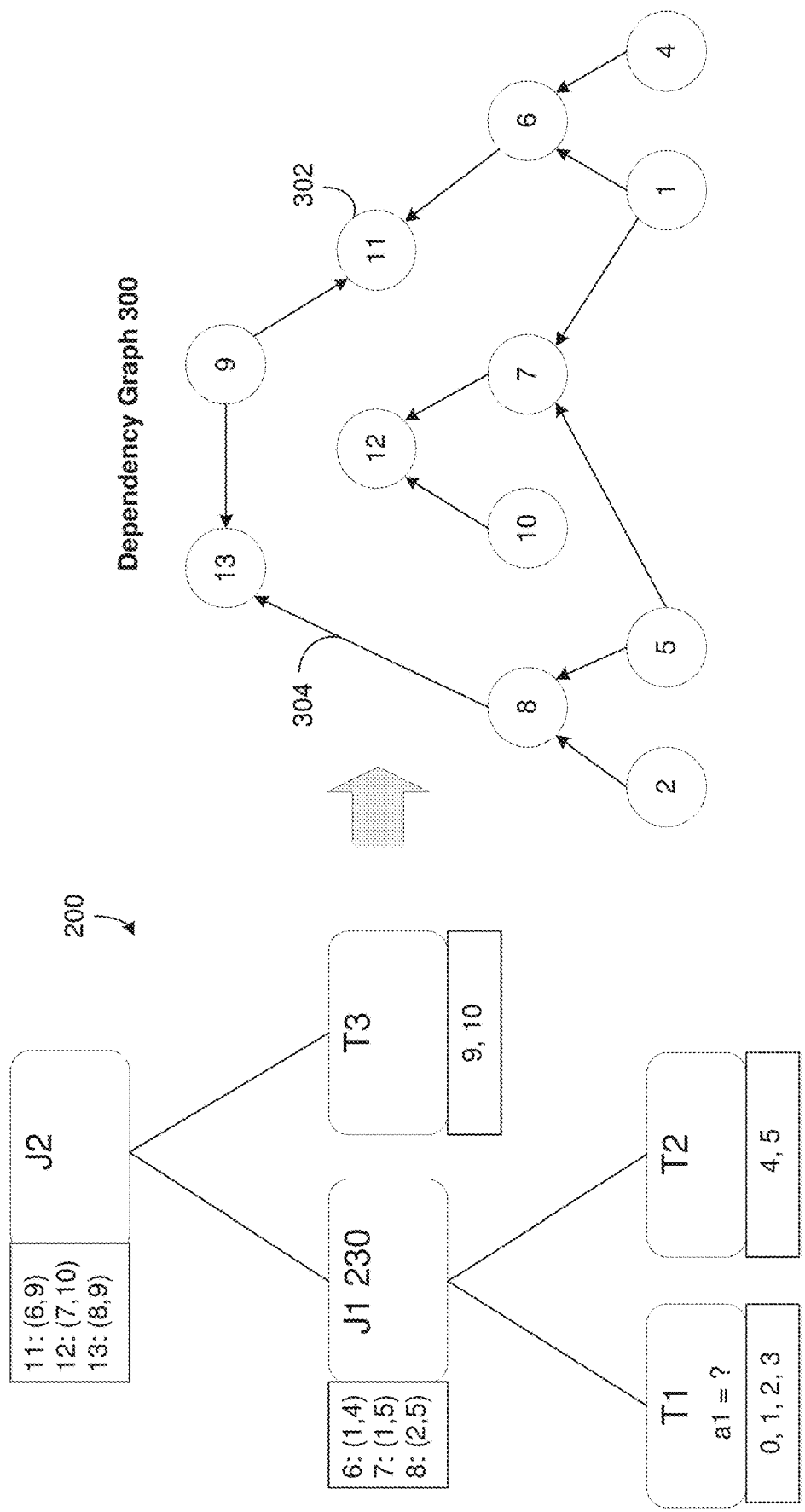
FIG. 3 is a diagram illustrating a process of transforming the query graph of FIG. 2 into a dependency graph for the partitions in accordance with an example embodiment.

However, according to various embodiments, the query graph 200 may be converted or otherwise transformed into a form that can be used effectively even after compile time. In particular, the query graph 200 can be converted into a dependency graph based on the partition candidates included the query graph 200. FIG. 3 illustrates a process 300 of transforming the query graph 200 of FIG. 2 into a dependency graph 310 for the partitions in accordance with an example embodiment.

Referring to FIG. 3, the dependency graph 300 includes nodes 302 with links 304 in between them representing the join dependencies of the various partition candidates from the query graph 200. The first join operation (J1) includes three possible partition candidates 6, 7, and 8, which are created by combining three pairs of respective partitions (1,4), (1,5), and (2,5) from the first and second tables T1 and T2. In this case, neither partition 0 or partition 3 from the first table T1 is involved in the partition candidates created by the first join operation J1. Therefore, these partitions can be excluded from the dependency graph 300.

Meanwhile, partitions 1 and 4 are the input partition candidates into the join operation J1 which creates partition candidate 6. Likewise, partition candidates 1 and 5 are the input partitions into the join operation J1 to create partition candidate 7. Furthermore, partition candidates 2 and 5 are the input partitions into the join operation J1 which further creates partition candidate 8. Each of these three relationships are represented by nodes and links in the dependency graph 300.

Figure 4B:
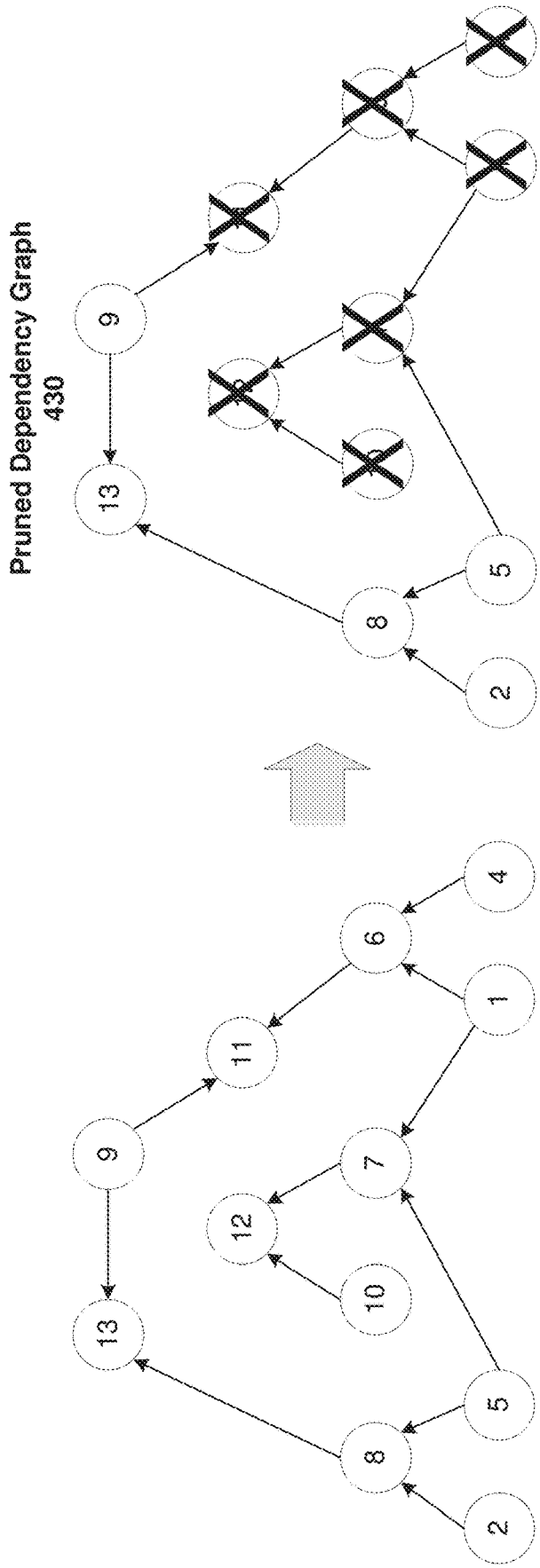
FIG. 4B is a diagram illustrating a resulting dependency graph after pruning of the partition candidates in accordance with an example embodiment.

Next, partitions from table T3 are joined with resulting partition candidates from the join operation J1 through a second join operation J2 which creates partition candidates 11, 12, and 13. Each of these relationships can be depicted in the dependency graph 300. For example, partition candidates 6 and 9 are input into the second join operation J2 to create partition candidate 11. Furthermore, partition candidates 7 and 10 are input into the second join operation J2 to create partition candidate 12. Likewise, partition candidates 8 and 9 are input into the second join operation J2 to create partition candidate 13. Each of these relationships is further added the dependency graph 300. Here, the dependency graph is a direct acyclic graph. The dependency graph 300 can be built prior to the database query being compiled or executed. Accordingly, when a runtime parameter (table identifier) is received during execution of a database query, the database may use the dependency graph 300 to quickly prune partitions from the query based on various propagations described with respect to FIGS. 4A and 4B.

FIG. 4A illustrates a process 400 of pruning partition candidates in accordance with an example embodiment. Referring to FIG. 4A, in this example a table parameter of a1=6 is received during runtime/execution. In other words, a table value of a1=6 is included in a database query associated with the partition-wise join operation shown in the example of FIG. 2. Referring again to FIG. 2, the first table 220 includes the column a1 as a parameter value. The value of a1=6 means that only partition candidates which have a value of a1=6 need to be read during the query operation and the remaining partition candidates (i.e., which do not have a possible value of a1=6) can be excluded. In the example of FIG. 2, partitions 0 and 2 from the first table 220 have such a value (a1=6) while partitions 1 and 3 can be excluded.

Referring now to FIG. 3, using this information, the dependency graph can be traversed to prune partitions. In particular, partitions 0 and 3 have already been excluded from the dependency graph 300 based on join dependencies of the join operations in FIG. 2. Therefore, the only remaining partitions are partition 1 and partition 2. Because partition 1 does not have the possibility of a table value of a1=6, partition 1 can be excluded from the join dependency graph 300.

Furthermore, as shown in the example of FIG. 4A, additional partitions can be pruned based on their input/output relationship with other partitions in the dependency graph 300. Here, the algorithm may include two rules including a forward propagation and a backward propagation. For the forward propagation, when an excluded partition candidate is an input to another node on the graph (join dependency) the other node on the graph can also be excluded. In the example of FIG. 4A, node 1 (corresponding to partition 1) has been excluded because the value of a1=6 is not possible. In addition, based on forward propagation 400 within the dependency graph 300, the nodes 6 and 7 can also be excluded in 402 and 404 because they receive node 1 as an input. Likewise, in a next forward propagation 410, nodes 11 and 12 can be excluded in 412 and 414 because they receive nodes 6 and 7, respectively, as inputs.

The backward propagation rule is used to exclude partition candidates when all outputs of the partition candidate have been excluded. In the backward propagation 420 of FIG. 4A, node 4 is only an input to node 6 (node 6 is the output of node 4). Here, node 6 has been excluded. Therefore, node 4 can likewise be excluded in 422 because all of its possible outputs are excluded. Similarly, node 10 is only an input to node 12 and node 12 has been excluded. Therefore, node 10 can also be excluded in 424 because all of its possible outputs are excluded. The results of the exclusion of partition candidates 1, 4, 6, 7, 10, 11, and 12 are shown in the pruned dependency graph 430 in FIG. 4B.

Once the partition candidates have been pruned, the database may perform the database access for the query operation based on the remaining partition candidates (i.e., reading in only the partition candidates remaining).

Partition pruning can dramatically reduce the amount of data retrieved from disk and shorten processing time, even when a query parameter (table identifier) is unknown before execution, thus improving query performance and optimizing resource utilization. The pruning limits the number of partitions that are read when querying the database. However, when an SQL query has an unknown runtime parameter, a pruning operation cannot be performed during compile time. In other words, without a table identifier the database cannot tell which partitions are involved at compile time (and which partitions to exclude) because the parameter is not given until runtime (after compile time). Runtime parameter is commonly used by an application developer to execute a same query with different parameter values.

To address this issues, the example embodiments create a dependency graph such as shown in the example of FIG. 3. Here, the dependency graph can be created during compile time (or before) even without knowing the table parameter. When the table parameter is given during execution, the database can prune partitions based on forward and backward propagations within the dependency graph. By pruning, these partitions the database will not touch these partitions during a database read operation thereby creating performance gain. After the pruning is done, the join operations are then processed. Some partitions are not in memory. By runtime pruning, the database prevents unnecessary partitions from having to be loaded from disk.

Figure 5:
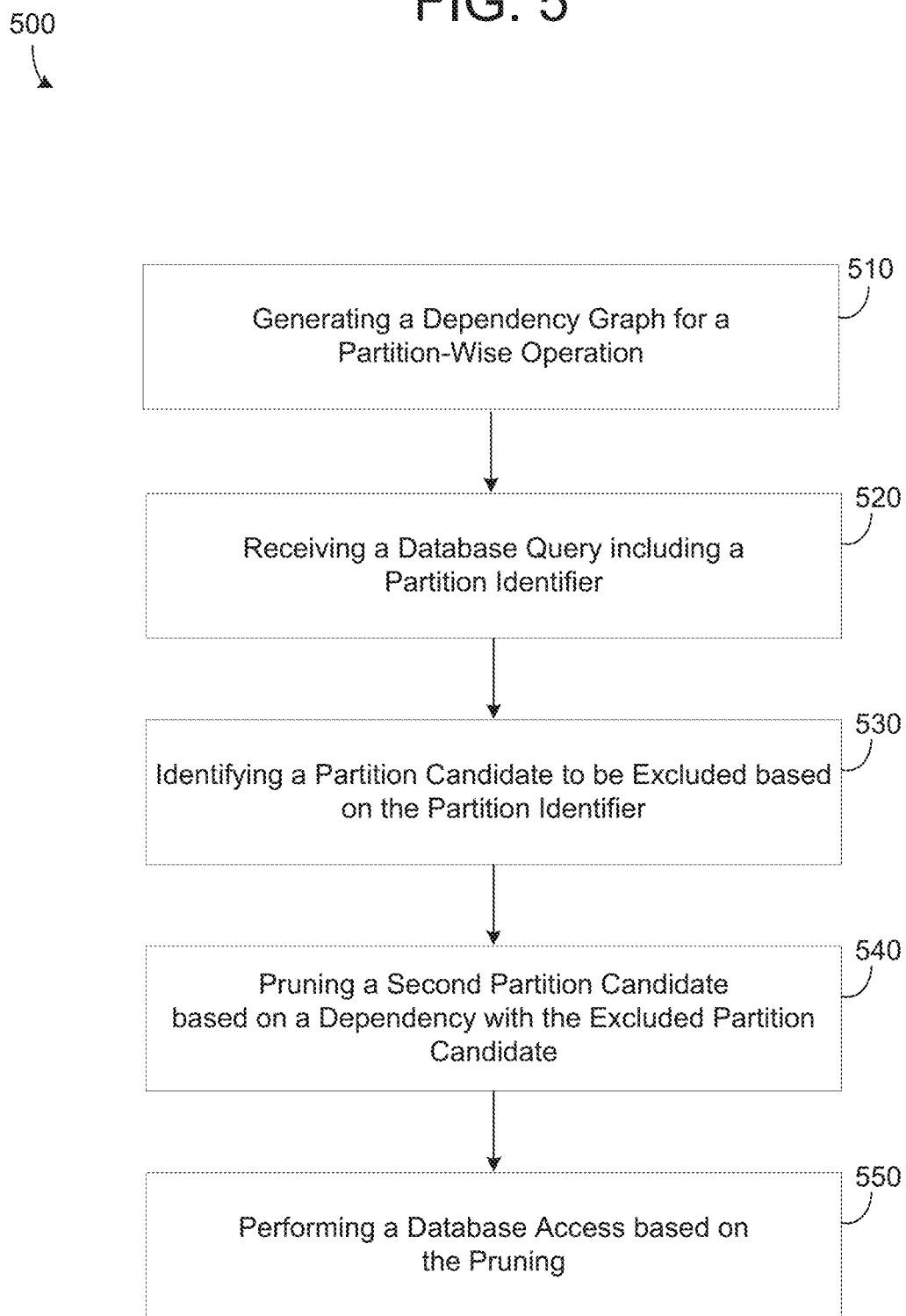
FIG. 5 is a diagram illustrating a method of pruning partition candidates based on a dependency graph in accordance with an example embodiment.

FIG. 5 illustrates a method 500 of pruning partition candidates based on a dependency graph in accordance with an example embodiment. For example, the method 500 may be performed by a database node, a cloud platform, a server, a computing system (user device), a combination of devices/nodes, or the like. Referring to FIG. 5, in 510, the method may include generating a dependency graph for a partition-wise join operation and storing the dependency graph in a storage device. For example, the dependency graph may include nodes representing partition candidates and links between the nodes identifying join dependencies of the partition candidates. The partition candidates may be partitions that are read from the database as well as paired result of partitions that are combined as a result of a join operation. In some embodiments, the dependency graph may include a direct acyclic graph. In some embodiments, the generating may include assigning each partition candidate a unique identifier and a respective node in the dependency graph In 520, the method may include receiving a database query comprising a partition identifier. For example, the database query may specify that the table to be accessed is unknown and will be a runtime parameter. In 530, the method may include identifying a partition candidate that can be excluded from processing the database query based on the partition identifier. For example, the system may bind the partition identifier to the query operation during an execution phase. Furthermore, in 540 the method may include pruning a second partition candidate based on a join dependency in the dependency graph between the excluded partition candidate and the second partition candidate, and in 550, the method may include performing a database access for the database query based on the pruning.

In some embodiments, the pruning may include pruning a second partition candidate having a node in the dependency graph that is dependent on an output of the node corresponding to the excluded partition candidate. Here, the pruning may be a forward propagation based on the second partition candidate receiving the output of the first partition candidate in the dependency graph. As another example, the pruning may include pruning a third partition candidate having a node in the dependency graph that is dependent on an output of the node of the pruned second partition candidate. This may also be referred to as a forward propagation where the output of the second partition candidate is an input of the third partition candidate in the dependency graph. As another example, the pruning may include pruning a third partition candidate having a node in the dependency graph that provides an input to the node of the pruned second partition candidate. Here, the pruning may be a backward propagation based on all of the potential output nodes of the third partition candidate being eliminated. In some embodiments, the generating of the dependency graph is performed prior to runtime and the pruning is performed during runtime.

Figure 6:
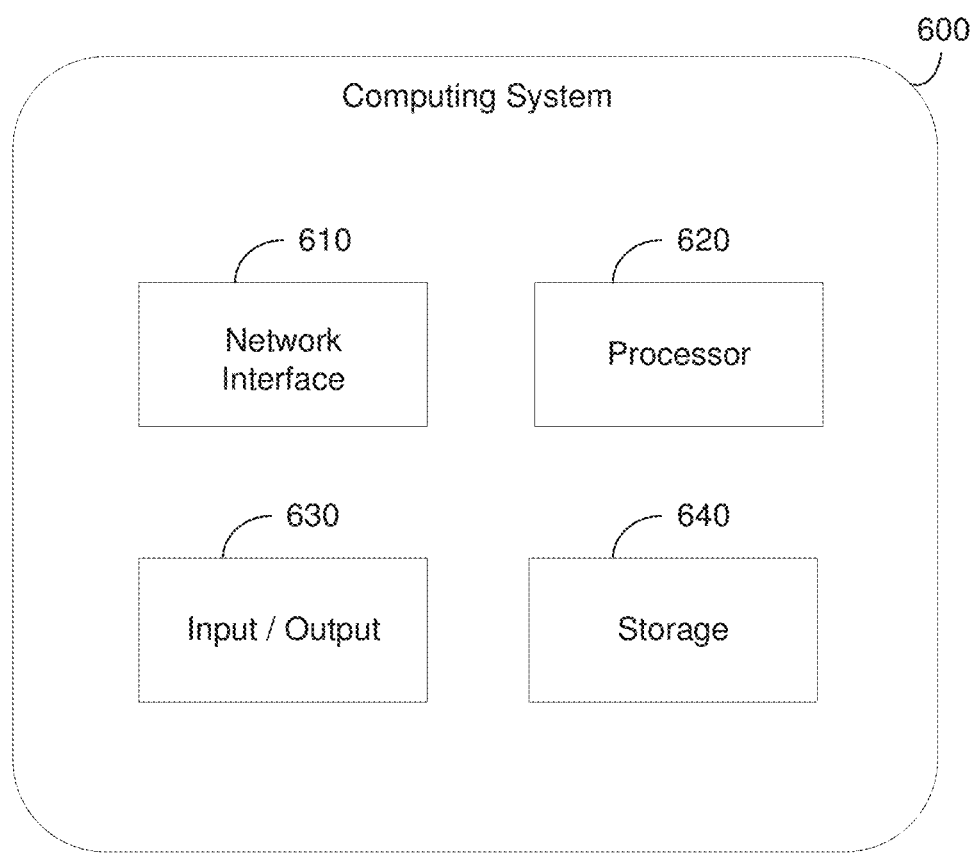
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 5. According to various embodiments, the storage 640 may include a data store having a plurality of tables, partitions and sub-partitions. The storage 640 may be used to store database records, items, entries, and the like.

According to various embodiments, the processor 620 may generate a dependency graph for a partition-wise join operation and store the dependency graph in the storage 640. For example, the dependency graph may include nodes representing partition candidates and links between the nodes identifying join dependencies of the partition candidates. According to various embodiments, the processor 620 may receive a database query that includes a partition identifier. Here, the database query may be received at execution time, and after compile time. In response, the processor 620 may identify a partition candidate that can be excluded from processing the database query based on the partition identifier. Furthermore, the processor 620 may prune a second partition candidate based on a join dependency in the dependency graph between the excluded partition candidate and the second partition candidate, and perform a database access for the database query based on the pruning. Here, the processor 620 may read data from the database (e.g., from disk into main memory, etc.) based on only the remaining partition candidates which have not been pruned.

In some embodiments, the processor 620 may prune a second partition candidate having a node in the dependency graph that is dependent on an output of the node corresponding to the excluded partition candidate. As another example, the processor 620 may prune a third partition candidate having a node in the dependency graph that is dependent on an output of the node of the pruned second partition candidate. As another example, the processor 620 may prune a third partition candidate having a node in the dependency graph that provides an input to the node of the pruned second partition candidate. As another example, the processor 620 may generate the dependency graph prior to runtime of the database access operation and prune the second partition candidate based on the dependency graph during execution.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), and/or random-access memory (RAM). The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/ machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a memory and
a processor configured to:
transform, prior to runtime, a query graph of a query operation into a dependency graph based on possible join operations within the query operation, the dependency graph comprising a first subset of nodes representing partitions from a database prior to being joined, a second subset of nodes representing pairs of the partitions from the different tables paired together by possible join operations, and links between the first and second subsets of nodes identifying join dependencies between the partitions,
receive, from a software application at runtime, a database query associated with the query operation, the database query comprising a partition identifier of a first table,
prune a first partition of the first table of the database from among a first list of partition candidates of the first table to be read during a read operation based on the partition identifier,
prune a second partition of a second table of the database from among a second list of partition candidates of the second table to be read during the read operation via a forward propagation within the dependency graph based on a join dependency between a node in the dependency graph that includes the first partition of the first table and a node in the dependency graph that includes the first partition paired with the second partition of the second table,
prune a third partition of a third table of the database from among a third list of partition candidates of the third table to be read during the read operation via a backward propagation within the dependency graph based on a backwards join dependency between the node that includes the first partition paired with the second partition and a node that includes the third partition of the third table,
execute the read operation which queries only remaining partitions within the first, second, and third pruned lists of partition candidates of the first, second, and third tables, respectively, in response to the database query, and
return query results from the read operation executed on the remaining partitions to the software application.

2. The computing system of claim 1, wherein the processor is configured to identify the node that includes the first partition paired with the second partition in the dependency graph that is join-dependent on an output of the node that includes the first partition.

3. The computing system of claim 2, wherein processor is configured to prune the third partition from the third list of partition candidates of the third table when the node that includes the first partition paired with the second partition in the dependency graph is join-dependent on an output of a node that includes the third partition.

4. The computing system of claim 1, wherein the processor is further configured to generate the dependency graph prior to runtime of the read operation and prune the second partition and the third partition based on the dependency graph during runtime of the read operation.

5. The computing system of claim 1, wherein the dependency graph comprises a direct acyclic graph (DAG).

6. The computing system of claim 1, wherein the processor assigns each partition candidate a unique identifier in the dependency graph.

7. The computing system of claim 1, wherein a partition comprises an initial partition of table data from the database or a resulting partition generated based on a join operation of a pair partitions of table data.

8. A method comprising:
transforming, prior to runtime, a query graph of a query operation into a dependency graph based on possible join operations within the query operation, the dependency graph comprising a first subset of nodes representing partitions from a database prior to being joined, a second subset of nodes representing pairs of the partitions from the different tables paired together by possible join operations, and links between the first and second subsets of nodes identifying join dependencies between the partitions;
receiving, from a software application at runtime, a database query associated with the query operation, the database query comprising a partition identifier of a first table;

pruning a first partition of the first table of the database from among a first list of partition candidates of the first table to be read during a read operation based on the partition identifier;

pruning a second partition of a second table of the database from among a second list of partition candidates of the second table to be read during the read operation via a forward propagation within the dependency graph based on a join dependency between a node in the dependency graph that includes the first partition of the first table and a node in the dependency graph that includes the first partition paired with the second partition of the second table;

pruning a third partition of a third table of the database from among a third list of partition candidates of the third table to be read during the read operation via a backward propagation within the dependency graph based on a backwards join dependency between the node that includes the first partition paired with the second partition and a node that includes the third partition of the third table;

executing the read operation which queries only remaining partitions of the database within the first, second, and third pruned list of partition candidates of the first, second, and third tables, respectively, in response to the database query; and returning query results from the read operation executed on the remaining partitions to the software application.

9. The method of claim 8, wherein the excluding the second partition comprises identifying the node that includes the first partition paired with the second partition in the dependency graph is join-dependent on an output of the node that includes the first partition.

10. The method of claim 9, wherein the method further comprises pruning the third partition from the third list of partition candidates of the third table when the node that includes the first partition paired with the second partition in the dependency graph is join-dependent on an output of a node that includes the third partition.

11. The method of claim 8, wherein the transforming comprises generating the dependency graph prior to runtime of the read operation and the pruning of the second partition and the third partition based on the dependency graph during runtime of the read operation.

12. The method of claim 8, wherein the dependency graph comprises a direct acyclic graph (DAG).

13. The method of claim 8, wherein the generating comprises assigning each partition candidate a unique identifier in the dependency graph.

14. The method of claim 8, wherein a partition comprises an initial partition of table data from the database or a resulting partition generated based on a join operation of a pair partitions of table data.

15. A non-transitory computer-readable medium storing instructions which when executed by a processor cause a computer to perform a method comprising:

transforming, prior to runtime, a query graph of a query operation into a dependency graph based on possible join operations within the query operation, the dependency graph comprising a first subset of nodes representing partitions from a database prior to being joined, a second subset of nodes representing pairs of the partitions from the different tables paired together by possible join operations, and links between the first and second subsets of nodes identifying join dependencies between the partitions;

receiving, from a software application at runtime, a database query associated with the query operation, the database query comprising a partition identifier of a first table;

pruning a first partition of the first table of the database from among a first list of partition candidates of the first table to be read during the read operation based on the partition identifier;

pruning a second partition of a second table of the database from among a second list of partition candidates of the second table to be read during the read operation based via a forward propagation within the dependency graph based on a join dependency between a node in the dependency graph that includes the first partition of the first table and a node in the dependency graph that includes the first partition paired with the second partition of the second table;

pruning a third partition of a third table of the database from among a third list of partition candidates of the third table to be read during the read operation via a backward propagation within the dependency graph based on a backwards join dependency between the node that includes the first partition paired with the second partition and a node that includes the third partition of the third table;

executing the read operation which queries only remaining partitions of the database within the first, second, and third pruned list of partition candidates of the first, second, and third tables, respectively, in response to the database query; and returning query results from the read operation executed on the remaining partitions to the software application.

16. The non-transitory computer-readable medium of claim 15, wherein the pruning the second partition comprises identifying the node that includes the first partition paired with the second partition in the dependency graph is join-dependent on an output of the node that includes the first partition.

17. The non-transitory computer-readable medium of claim 16, wherein the method further comprises pruning the third partition from the third list of partition candidates of the third table when the node that includes the first partition paired with the second partition in the dependency graph is join-dependent on an output of a node that includes the third partition.

* * * * *